(12) United States Patent
McCommons et al.

(10) Patent No.: US 8,788,963 B2
(45) Date of Patent: Jul. 22, 2014

(54) SCROLLABLE PREVIEW OF CONTENT

(75) Inventors: Jordan McCommons, San Francisco, CA (US); Fernando Garcia, Los Angeles, CA (US); Gregory Niles, Culver City, CA (US)

(73) Assignee: Apple Inc., Cupertino, CA (US)

( * ) Notice: Subject to any disclaimer, the term of this patent is extended or adjusted under 35 U.S.C. 154(b) by 453 days.

(21) Appl. No.: 12/252,350

(22) Filed: Oct. 15, 2008

(65) Prior Publication Data

US 2010/0095239 A1 Apr. 15, 2010

(51) Int. Cl.
G06F 3/048 (2013.01)
G11B 27/036 (2006.01)

(52) U.S. Cl.
CPC .................................. G11B 27/036 (2013.01)
USPC ............................ 715/784; 715/723; 715/803

(58) Field of Classification Search
CPC ...................................... G11B 27/036
USPC ......................................... 715/784, 803, 723
See application file for complete search history.

(56) References Cited

U.S. PATENT DOCUMENTS

| | | |
|---|---|---|
| 5,151,998 A | 9/1992 | Capps |
| 5,204,969 A | 4/1993 | Capps et al. |
| 5,682,326 A | 10/1997 | Klingler et al. |
| 5,692,117 A | 11/1997 | Berend et al. |
| 5,847,706 A | 12/1998 | Kingsley |
| 6,061,062 A | 5/2000 | Venolia |
| 6,154,601 A | 11/2000 | Yaegashi et al. |
| 6,172,675 B1 | 1/2001 | Ahmad et al. |
| 6,204,840 B1 | 3/2001 | Petelycky et al. |
| 6,239,846 B1 | 5/2001 | Billing |
| 6,404,978 B1 | 6/2002 | Abe |
| 6,486,896 B1 * | 11/2002 | Ubillos .......................... 715/784 |
| 6,704,029 B1 | 3/2004 | Ikeda et al. |
| 6,744,968 B1 | 6/2004 | Imai et al. |
| 6,763,175 B1 | 7/2004 | Trottier et al. |
| 6,774,968 B2 | 8/2004 | Hagiwara |
| 6,828,971 B2 | 12/2004 | Uesaki et al. |
| 6,848,117 B1 | 1/2005 | Emura |
| 6,867,787 B1 | 3/2005 | Shimizu et al. |

(Continued)

FOREIGN PATENT DOCUMENTS

WO     WO 2010/106586     9/2010

OTHER PUBLICATIONS

Show Me Microsoft Office 2003 ISB 0-7897-3007-3 Published Sep. 2003.*

(Continued)

*Primary Examiner* — Peiyong Weng
(74) *Attorney, Agent, or Firm* — Adeli LLP

(57) ABSTRACT

Some embodiments provide a method for displaying content. The method provides a first display area for displaying content and receiving modifications to the content. The method provides a second display area for displaying a preview of the content. In some embodiments, a modification to the content automatically causes a corresponding modification to the preview. In some embodiments, the size of the content is larger than the size of the first display area and the first display area only displays a portion of the content. In some such embodiments, the second display area displays the entirety of the preview of the entire content at once. Some embodiments also provide a window in the second display area that indicates in the preview the portion of the content concurrently displayed in the first display area.

29 Claims, 14 Drawing Sheets

(56) References Cited

U.S. PATENT DOCUMENTS

| | | | |
|---|---|---|---|
| 6,928,613 | B1 | 8/2005 | Ishii et al. |
| 6,956,574 | B1 | 10/2005 | Cailloux et al. |
| 7,030,872 | B2 | 4/2006 | Tazaki |
| 7,035,435 | B2 | 4/2006 | Li et al. |
| 7,062,713 | B2 | 6/2006 | Schriever et al. |
| 7,194,676 | B2 | 3/2007 | Fayan et al. |
| 7,243,299 | B1 | 7/2007 | Rubin et al. |
| 7,317,457 | B2 | 1/2008 | Felt |
| 7,325,199 | B1 | 1/2008 | Reid |
| 7,383,508 | B2 | 6/2008 | Toyama et al. |
| 7,383,509 | B2 | 6/2008 | Foote et al. |
| 7,434,155 | B2 | 10/2008 | Lee |
| 7,437,674 | B2 | 10/2008 | Chen |
| 7,480,864 | B2 | 1/2009 | Brook et al. |
| 7,518,611 | B2 | 4/2009 | Boyd et al. |
| 7,720,349 | B2 | 5/2010 | Ogikubo |
| 7,725,828 | B1 | 5/2010 | Johnson |
| 2002/0140719 | A1 | 10/2002 | Amir et al. |
| 2002/0154140 | A1 | 10/2002 | Tazaki |
| 2002/0156805 | A1 | 10/2002 | Schriever et al. |
| 2003/0090504 | A1 | 5/2003 | Brook et al. |
| 2003/0164845 | A1 | 9/2003 | Fayan et al. |
| 2003/0234803 | A1 | 12/2003 | Toyama et al. |
| 2004/0088723 | A1 | 5/2004 | Ma et al. |
| 2004/0090462 | A1* | 5/2004 | Graham .................. 345/767 |
| 2004/0125124 | A1 | 7/2004 | Kim et al. |
| 2004/0194033 | A1* | 9/2004 | Holzwarth et al. ........... 715/530 |
| 2004/0201609 | A1 | 10/2004 | Obrador |
| 2005/0231512 | A1 | 10/2005 | Niles et al. |
| 2006/0005130 | A1 | 1/2006 | Hiroi et al. |
| 2006/0059426 | A1 | 3/2006 | Ogikubo |
| 2006/0109271 | A1 | 5/2006 | Lomask |
| 2007/0093913 | A1 | 4/2007 | Ferguson et al. |
| 2007/0104384 | A1 | 5/2007 | Shaw |
| 2007/0154190 | A1 | 7/2007 | Gilley et al. |
| 2007/0159487 | A1 | 7/2007 | Felt |
| 2007/0192729 | A1* | 8/2007 | Downs .................. 715/786 |
| 2008/0037873 | A1* | 2/2008 | Berkner et al. ............... 382/176 |
| 2008/0152297 | A1 | 6/2008 | Ubillos |
| 2008/0152298 | A1 | 6/2008 | Ubillos |
| 2008/0155420 | A1 | 6/2008 | Ubillos et al. |
| 2008/0155421 | A1 | 6/2008 | Ubillos et al. |
| 2008/0184288 | A1 | 7/2008 | Lipscomb |
| 2009/0089689 | A1* | 4/2009 | Clark et al. ................... 715/762 |
| 2009/0172543 | A1 | 7/2009 | Cronin et al. |
| 2009/0222722 | A1* | 9/2009 | Vaschillo et al. ............ 715/245 |
| 2010/0031162 | A1 | 2/2010 | Wiser et al. |
| 2010/0201692 | A1 | 8/2010 | Niles et al. |
| 2010/0275121 | A1 | 10/2010 | Johnson |

OTHER PUBLICATIONS

Pro CSS and HTML Design Patterns published in 2007 ISBN-13 (pbk): 978-1-59059-804-7.*

Bennett, Eric P., et al., "Proscenium: A Framework for Spatio-Temporal Video Editing", *MM'03*, Nov. 2-8, 2003, Berkeley, California, USA.

Casares, Juan, et al., "Simplifying Video Editing Using Metadata," Proceedings of Designing Interactive Systems (DIS 2002), Jun. 2002, pp. 157-166, London, United Kingdom.

Diakopoulos, Nicholas, et al., "Videotater: An Approach for Pen-Based Digital Video Segmentation and Tagging," Proceedings of the 19th Annual ACM Symposium on User Interface Software and Technology (UIST'06), Oct. 15-18, 2006, pp. 221-224, Montreux, Switzerland.

Myers, Brad A., et al., "A Multi-View Intelligent Editor for Digital Video Libraries," The First ACM+IEEE Joint Conference on Digital Libraries (JCDL'01), Jun. 24-28, 2001, pp. 106-115, Roanoke, VA, USA.

Author Unknown, "Apple Announces Final Cut Pro 4," NAB, Apr. 6, 2003, Apple Inc., Las Vegas, NV, USA.

Author Unknown, "Adobe Premiere Pro CS3: Classroom in a Book", Month Unknown, 2008, Chapters 9 and 10.

Author Unknown, "Using Adobe Flash CS4 Professional," Month Unknown, 2008, Adobe Systems Incorporated, San Jose, California, USA.

Author Unknown, "Adobe Director 11: User Guide," Month Unknown, 2008, Adobe Systems Incorporated, San Jose, California, USA.

Author Unknown, "Adobe Premiere Pro CS3: User Guide," Month Unknown, 2007, Adobe Systems Incorporated, San Jose, California, USA.

Author Unknown, "Cinelerra CV Manual," Chapters 1, 2 and 18, Mar. 8, 2008.

Author Unknown, "Cinelerra Linux Video Editing, Cinelerra Cv Manual Section 18: Keyframing," Feb. 16, 2008.

Author Unknown, "iMovie '08 Getting Started," Month Unknown, 2008, Apple Inc., USA.

Author Unknown, "KDenLive Open Source Video Editing, Keyframe for Every Video and Audio Effect Variable in the Effects Stack," Nov. 10, 2008 through May 1, 2009.

Brenneis, Lisa, "Final Cut Pro 3 for Macinotsh: Visual QuickPro Guide," Apr. 2002, Peachpit Press, Berkely, California, USA.

Meade, Tom, et al., "Maya 6: The Complete Reference," Month Unknown, 2004, pp. iv-xviii, 194, 204, McGraw-Hill Professional, USA.

Sauer, Jeff, "Review: Apple Final Cut Pro 4," Oct. 3, 2003.

Spencer, Mark, "Working with Keyframes in Motion, Part 1: Creating and Manipulating Keyframes," The Ken Stone Index, Feb. 11, 2005.

Stone, Ken, "Basic Keyframing in Final Cut Express", The Ken Stone Index, Jan. 27, 2003, V. 1.0.1, Ken Stone.

Stone, Ken, "Motion Paths and the Bezier Handle in FCP," The Ken Stone Index, Aug. 13, 2001, Ken Stone.

* cited by examiner

US 8,788,963 B2

SCROLLABLE PREVIEW OF CONTENT

FIELD OF THE INVENTION

The invention is directed towards displaying content. Specifically, the invention is directed towards displaying a navigable preview of visual content along with the visual content.

BACKGROUND OF THE INVENTION

Many computer application today use scrollbars. Typical web browsers, word processors, etc. have a bar on the right side with a box that can be dragged in order to scroll through content. Scrollbars also often have arrows that can be held down in order to cause the box to scroll. Generally, a user can also click in the scrollbar to cause the box to move. However, in many cases, clicking in the scrollbar causes the box (and correspondingly, the document, web page, etc.) to only move a short distance.

For long documents, web pages, etc., it can be difficult to quickly find a desired portion of the content using the scrollbar. Scrolling with arrows can be tedious and take a long time. Scrolling by dragging the box can be difficult: often a user will not easily be able to find the portion of content that is desired because the user will move past it and fail to recognize the portion. Therefore, there is a need in the art for more accurate methods of selecting a portion of a document, web page, or other visual content to display.

SUMMARY OF THE INVENTION

Some embodiments of the invention provide a novel method for displaying and navigating through visual content (e.g., text, images, etc.) in a display area. The method displays the visual content in a first display area. The method also displays, in a second display area, a preview of the visual content.

In some embodiments, the visual content is a set of text, images, or other content that is arranged vertically (or horizontally) such that all of the visual content may not be displayed at once in the first display area. For example, in some embodiments, the visual content is text-based content that has a continuous flow with no pre-specified page formatting. That is, no matter how long the text goes on for, there will not be any page breaks. Accordingly, some embodiments provide the ability to scroll through the visual content in the first display area, while providing a preview of the visual content in the second display area.

In some embodiments, the preview is a scaled-down version of the entirety of the visual content that fits entirely within the second display area. In some such embodiments, this is the case (i.e., the preview shows the entirety of the visual content) even if the content is a document that has page breaks. In some embodiments, the second display area is a fixed size.

Some embodiments allow a user to add to the content in the first display area or modify this content (e.g., add new content to old content in the first display area, delete content in the first display area, modify content in the first display area, resize this content, etc.). Some such embodiments automatically modify the preview in the second display area as the content in the first display area is modified, deleted, or augmented. For example, as content is added, the preview of some embodiments maintains the same scale compared to the content, and thus grows in size up to a threshold. Once the preview size reaches the threshold, as more content is added, some embodiments shrink the scale of the preview so that it fits entirely within the second display area.

Within the second display area, some embodiments display a window that indicates the portion of the visual content that is being concurrently displayed in the first display area. The window is displayed over the portion of the preview that corresponds to the portion of content concurrently displayed in the first display area. In some embodiments, the window maintains the same shape (e.g., the same aspect ratio) as the first display area. Accordingly, as the content grows longer and the preview becomes narrower, the window become narrower as well.

In some embodiments, the content scrolls through the first display area over a specified amount of time. In some such embodiments, particular locations within the preview correspond to particular times when the content that is represented at the particular locations of the preview is displayed in the first display area. In some such embodiments, the window moves over the preview automatically as the content scrolls through the first display area, highlighting on the preview the portion of content that is currently displayed in the first display area.

Some embodiments incorporate the described features into a media-editing application. For example, in some embodiments, the content is a credit roll, and the preview and window are used to navigate the credit roll for editing and other purposes. However, one of ordinary skill in the art will recognize that the features may also be used in other applications (e.g., operating systems, web browsers, etc.).

BRIEF DESCRIPTION OF THE DRAWINGS

The novel features of the invention are set forth in the appended claims. However, for purpose of explanation, several embodiments of the invention are set forth in the following figures.

DETAILED DESCRIPTION OF THE INVENTION

In the following description, numerous details are set forth for purpose of explanation. However, one of ordinary skill in the art will realize that the invention may be practiced without the use of these specific details. For instance, some of the techniques described below are described with relation to media-editing applications, but other embodiments may apply the techniques to other applications.

I. Overview

Some embodiments of the invention provide a novel method for displaying and navigating through visual content (e.g., text, images, etc.) in a display area. The method displays the visual content in a first display area. The method also displays, in a second display area, a preview of the visual content.

Figures 1, 2:
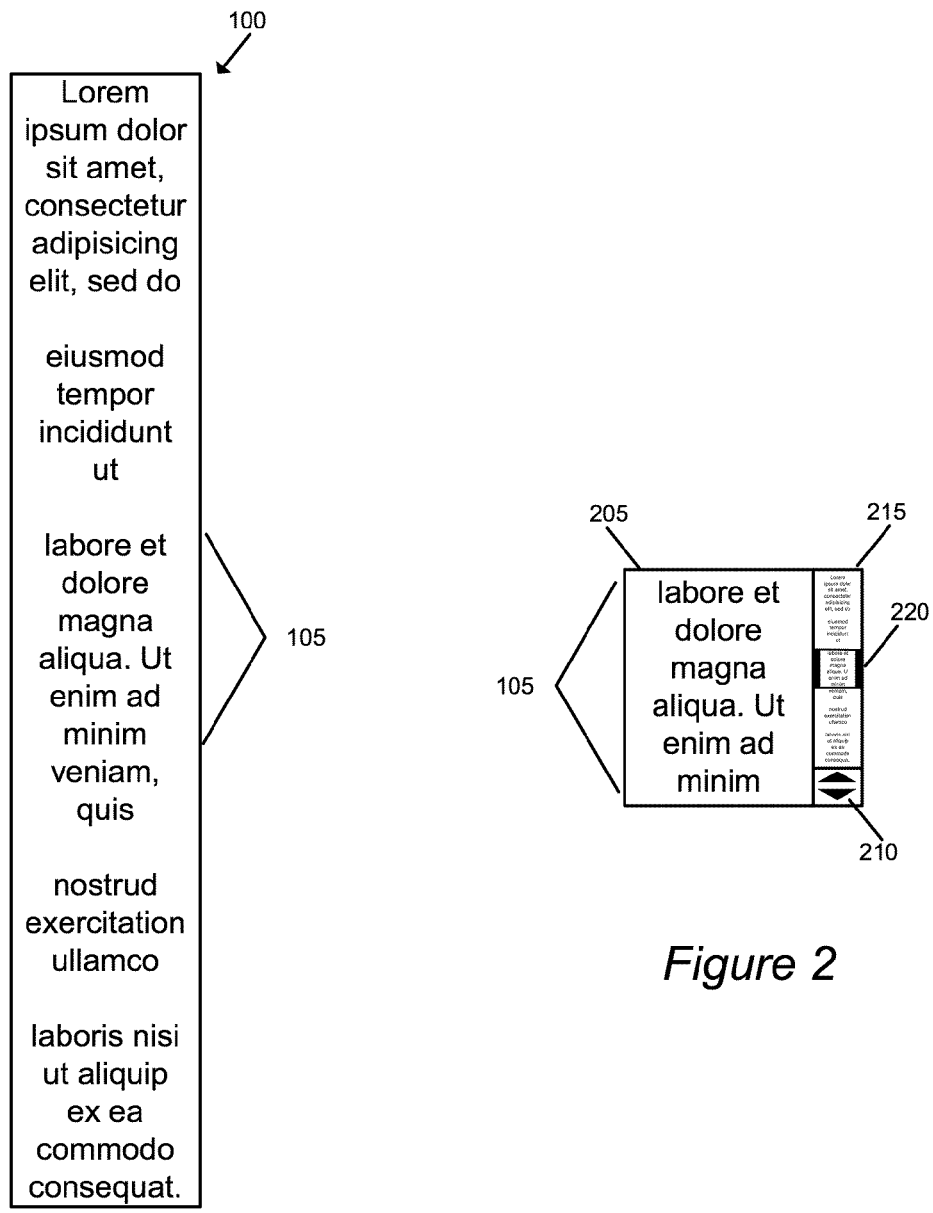
FIG. 1 illustrates an example of visual content.
FIG. 2 illustrates a scrollable preview of some embodiments of the visual content of FIG. 1.

In some embodiments, the visual content is a set of text, images, or other content that is arranged vertically (or horizontally) such that all of the visual content may not be displayed at once in the first display area. For example, FIG. 1 illustrates textual content 100 that is arranged vertically. In some embodiments, the visual content is text-based content that has a continuous flow with no pre-specified page formatting. That is, no matter how long the text goes on for, there will not be any page breaks. Accordingly, some embodiments provide the ability to scroll through the visual content in the first display area, while providing a preview of the visual content in the second display area.

FIG. 2 illustrates a first display area 205. Displayed in display area 205 is a portion 105 of content 100. Some embodiments include scroll arrows (or other such user interface items) that a user can select in order to scroll through the content. Arrows 210 are an example of such user interface items. For example, selecting the down arrow in some embodiments causes the portion of content shown in display area 205 to scroll downward through the content 100 (i.e., content below portion 105 would be displayed).

As mentioned above, a preview of the visual content is displayed in the second display area. FIG. 2 illustrates second display area 215 that includes a preview of content 100. In some embodiments, the preview is a scaled-down version of the entirety of the visual content that fits entirely within the second display area. In some such embodiments, this is the case (i.e., the preview shows the entirety of the visual content) even if the content is a document that has page breaks. In some embodiments, the second display area is a fixed size.

Some embodiments allow a user to add to the content in the first display area or modify this content (e.g., add new content to old content in the first display area, delete content in the first display area, modify content in the first display area, resize this content, etc.). Some such embodiments automatically modify the preview in the second display area as the content in the first display area is modified, deleted, or augmented. For example, as content is added, the preview of some embodiments maintains the same scale compared to the content, and thus grows in size up to a threshold. Once the preview size reaches the threshold, as more content is added, some embodiments shrink the scale of the preview so that it fits entirely within the first display area.

Within the second display area, some embodiments display a window that indicates the portion of the visual content that is being concurrently displayed in the first display area. The window is displayed over the portion of the preview that corresponds to the portion of content concurrently displayed in the first display area. FIG. 2 illustrates such a window 220. Shown in the window 120 is the portion of the preview corresponding to portion 105 of content 100. In some embodiments, the window maintains the same shape (e.g., the same aspect ratio) as the first display area. Accordingly, as the content grows longer and the preview becomes narrower, the window become narrower as well. The window 220 includes bars on either side so as to maintain the shape of the first display area 205.

In some embodiments, the content scrolls through the first display area over a specified amount of time. In some such embodiments, particular locations within the preview correspond to particular times when the content that is represented at the particular locations of the preview is displayed in the first display area. In some such embodiments, the window moves over the preview automatically as the content scrolls through the first display area, highlighting on the preview the portion of content that is currently displayed in the first display area.

Some embodiments incorporate the described features into a media-editing application. For example, in some embodiments, the content is a credit roll, and the preview and window are used to navigate the credit roll for editing and other purposes. However, one of ordinary skill in the art will recognize that the features may also be used in other applications (e.g., operating systems, web browsers, etc.).

II. Scrollable Preview

Figure 3:
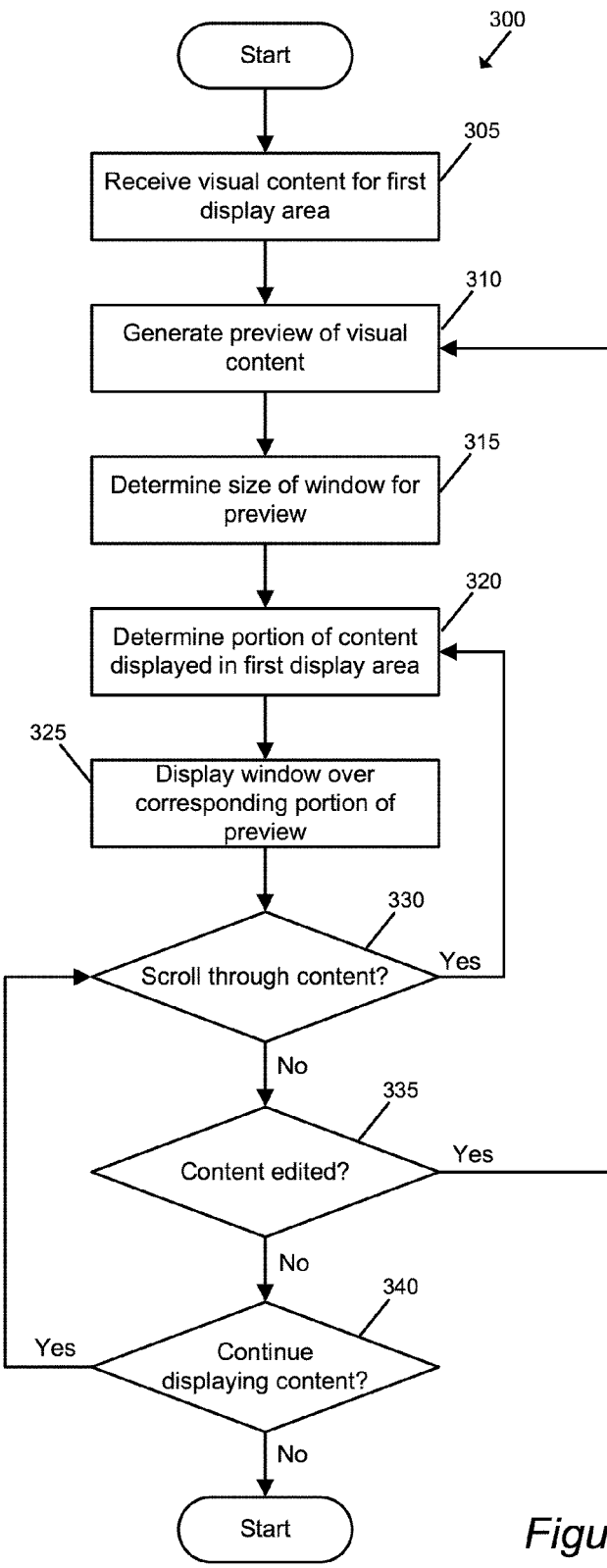
FIG. 3 illustrates a process of some embodiments for displaying visual content and a preview of the visual content.

FIG. 3 illustrates a process 300 of some embodiments for displaying visual content with a scrollable preview of the content. Process 300 begins when it receives (at 305) visual content to display in a first display area. The visual content can be text, images, or any other visual content in some embodiments. In some embodiments, a user imports the visual content into the first display area. For example, a user might copy and paste text from a word processor document into the first display area. In some embodiments, the process receives the content translated from a file such as an html file (e.g., if the display area is a web browser).

In many cases, the visual content will not entirely fit in the first display area. For example, the visual content may be vertically aligned, such that text that has a set horizontal width and a vertical length determined by the amount of text. The examples shown in the figures above and below involve vertically aligned content and vertical scrolling, but one of ordinary skill in the art would recognize that the invention is just as easily compatible with horizontally aligned content (e.g., a sequence of images aligned horizontally) and horizontal scrolling.

After receiving the visual content, the process generates (at 310) a preview of the visual content. The generated preview is a preview of the entirety of the content, shrunk to a size significantly smaller than the content itself. In some embodiments, the preview is displayed in a second display area with a fixed size. The second display area is a scrollbar aligned alongside the first display area in some embodiments.

Figure 4:
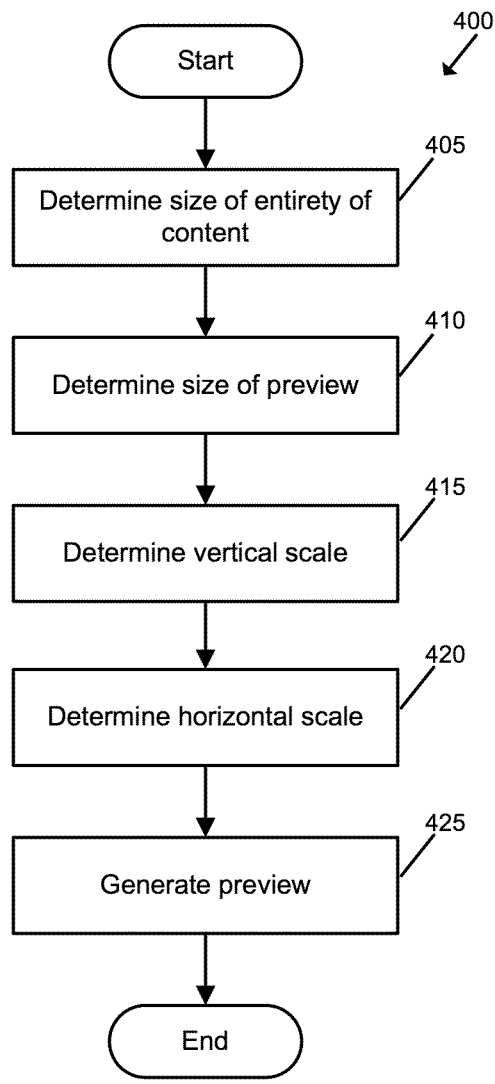
FIG. 4 illustrates a process of some embodiments for generating a preview.

FIG. 4 illustrates a process 400 of some embodiments for generating a preview. Process 400 starts at 405 by determining the size of the entirety of the content. In some embodiments, the width of the content is fixed by the width of the first display area, so determining the size of the content includes determining the length of the content. Process 400 then determines (at 410) the size of the preview. In some embodiments, the maximum size of the preview is the fixed size of the second display area.

When the preview is displayed in an area with a fixed size, some embodiments size the preview to include the entirety of the content and fit the fixed size of the second display area. Some embodiments have a preferred width for the preview (e.g., the width of the second display area), and if the preview is not too long, the preview will have the preferred width and may not fill the entire length of the second display area. However, if the preview is too long to fit in the second display area when at the preferred width (i.e., once the length of the content passes a threshold length), some embodiments shrink the preview such that it is narrower than the preferred width and short enough vertically to fit in the second display area.

Figure 5:
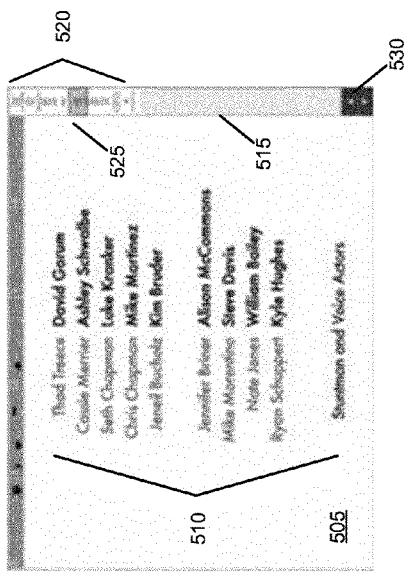
FIGS. 5-7 illustrate content and a scrollable preview of the content of some embodiments.
Figure 7:
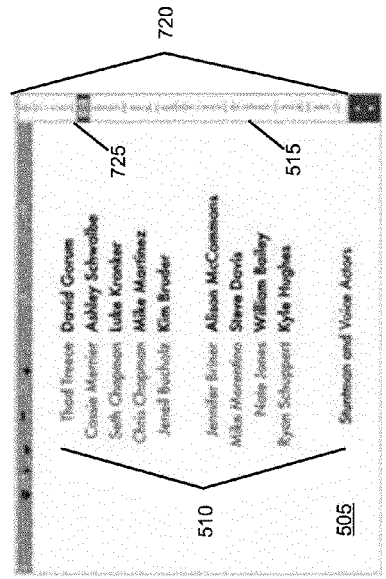
Figure 6:
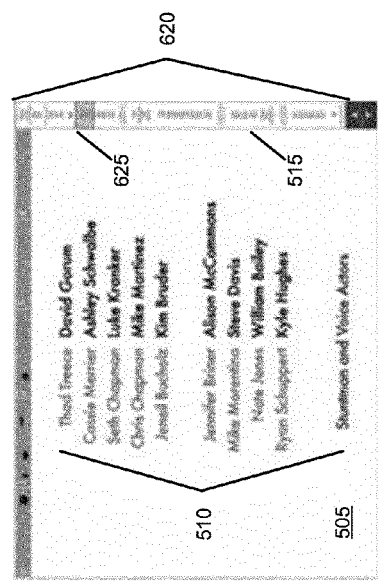

FIGS. 5-7 illustrate three examples of a first and second display area for visual content of different lengths. FIG. 5 illustrates first display area 505 in which a portion 510 of content is displayed. Along the right edge of the first display area 505 is second display area 515, in which preview 520 is displayed. The content that is previewed in second display area 515 is not especially long, and therefore the preview 520 does not take up the entirety of the second display area 515.

FIG. 6 illustrates the first display area 505 in which the same portion 510 of content is displayed. However, the content as a whole is significantly longer, and thus preview 620 takes up the entirety of second display area 515. The content is still short enough, though, that the preview 620 is at the preferred width (i.e., the content is not so long that the preview needs to be generated having a width smaller than the preferred width).

FIG. 7 illustrates the first display area 505 also with the same portion 510 of content displayed. In FIG. 7, the content as a whole is longer than either in FIG. 5 or 6. In fact, the content is long enough that preview 720 of the content is generated having a smaller width than the preferred preview width. Comparing FIGS. 6 and 7, preview 720 is the same absolute length as preview 620 (both take up the entirety of the second display area 515), but the width of preview 720 is noticeably smaller than the width of preview 620. Similarly, each line of preview 720 takes up less vertical space than each line of preview 620.

In the depicted embodiments, the entire preview of the visual content is displayed at once in the second display area. Some embodiments, rather than continuing to shrink the preview to fit the second display area, do not display the entire preview at once in the second display area. Instead, these embodiments display a portion of the preview in the second display area, and have separate controls (e.g., scroll arrows) to scroll through the preview in the second display area. The portion of the content to display in the first display area can be selected as in other embodiments, by scrolling, using the preview window, etc.

After determining the size of the preview, the process 400 determines (at 415) the vertical scale for generating the preview. The vertical scale of some embodiments is the ratio of the vertical size of the preview to the length of the content. The process then determines (at 420) the horizontal scale for generating the preview. The horizontal scale of some embodiments is the ratio of the horizontal size of the preview to the width of the content. In some embodiments, the horizontal scale must be the same as the vertical scale. Some embodiments first determine the vertical scale, then set the horizontal scale equal to the vertical scale.

Figure 8:
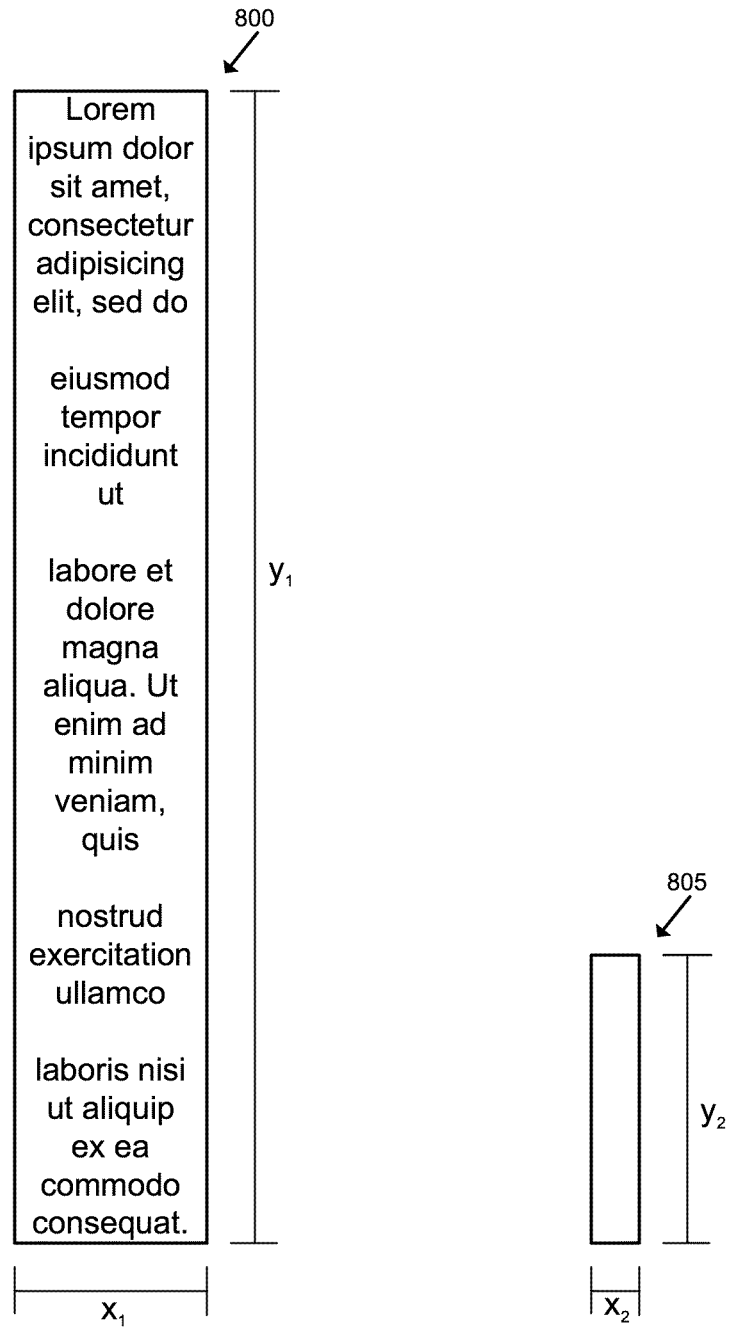
FIG. 8 illustrates the scaling of content into a preview of some embodiments.

FIG. 8 illustrates visual content 800 and area 805 (which may or may not be the entirety of the second display area) for displaying a preview. The visual content 800 would not necessarily all be displayed at once. Visual content 800 has a length of $y_1$ and a width of $x_1$. The area has a length of $y_2$ and a width of $x_2$. Accordingly, in the context of the process 400, the vertical scale for generating a preview of content 800 is $y_2:y_1$, while the horizontal scale for generating the preview is $x_2:x_1$.

After determining the vertical and horizontal scales, the process 400 generates (at 425) the preview. In some embodiments, to generate a preview of text, the process scales each letter individually. In some embodiments, once the size of a letter in the preview drops below a particular threshold, the process scales entire lines of text at once.

To scale a letter of text, some embodiments use the typographic bound of the letter. The typographic bound of a letter, in some embodiments, is the maximum height and maximum width of a letter. Some embodiments scale the typographic bound of the letter based on the horizontal and vertical scales determined at 415 and 420. Some embodiments then display each letter as a rectangle the size of the scaled typographic bound. Other embodiments display a "greeked" version of the letter (i.e., a rough representation of the text that approximates the appropriate pixel spacing) within the scaled typographic bound. To generate a preview of an image, some embodiments shrink the image while other embodiments generate a rough representation of the image (much like the greeked text). Some embodiments generate the preview as a single continuous image, while other embodiments generate the preview with breaks (e.g., breaks corresponding to page breaks in the content).

After generating the preview of the visual content, the process determines (at 315) the size of the window for the preview. In some embodiments, the window is constrained in that it must have a fixed aspect ratio. Specifically, in some embodiments, the preview window must have the same aspect ratio as the first display area. For example, in applications where the display areas are part of a video editing application, the first display area, and thus the preview window, might have an aspect ratio of 16:9 or 4:3.

Figure 9:
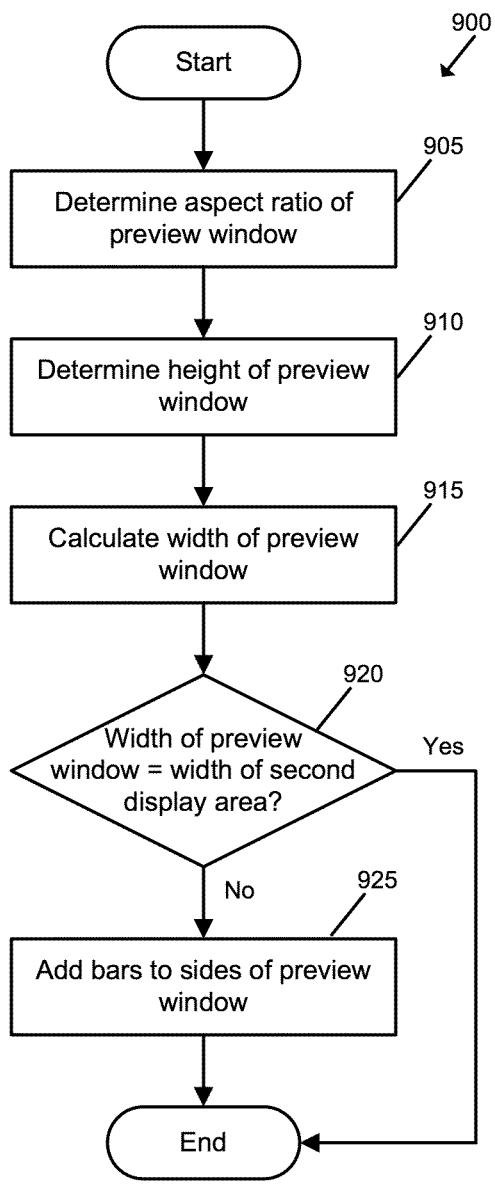
FIG. 9 illustrates a process of some embodiments for generating a preview window.

FIG. 9 illustrates a process 900 of some embodiments for determining the size of the preview window. In some embodiments, process 900 is performed at 315 of process 300. Process 900 begins at 905 by determining the aspect ratio of the preview window. In some embodiments, the aspect ratio matches the aspect ratio of the first display area in which the content is displayed. Thus, if the first display area has an aspect ratio of 16:9, then in some embodiments, the process 900 determines that the aspect ratio of the preview window is 16:9. In other embodiments, the aspect ratio is not fixed based on the size of the first display area.

Next, the process 900 determines (at 910) the height of the preview window. For instance, in some embodiments, the height of the preview window is determined in order to include only, but all of, the portion of the preview that is displayed in the first display area. In such embodiments, if the entirety of the visual content is longer, the height of the preview window will be smaller. This is because the preview of the visual content will be packed more tightly together in the fixed-size second display area, and therefore a particular portion (such as the portion displayed in the first display area) will take up less of the second display area.

Based on the determined aspect ratio and height, the process 900 calculates (at 915) the width of the preview window. In some embodiments, this is a simple calculation multiplying the height by the aspect ratio. For example, if the height is 9 pixels (or mm, or another unit of measurement) and the aspect ratio is 16:9, then the calculated width will be 16 pixels (or mm, or another unit of measurement). Similarly, if the aspect ratio is 4:3, then the calculated width will be 12 pixels (or mm, or another unit of measurement). Other embodiments, however, simply set the width of the preview window to the width of the second display area, ignoring aspect ratio.

After calculating the width of the preview window, the process 900 determines (at 920) whether the width of the preview window equals the width of the second display area. If the width of the preview window equals the width of the second display area, then that is all that is needed for the preview window, and the process 900 ends. On the other hand, if the width of the preview window does not equal the width of the second display area, then the process adds (at 925) bars between the edges of the second display area and the sides of the preview window. In some embodiments, the preview window is centered in the second display area so that any bars are the same size on either side of the preview window.

In some embodiments, the size of the preview window is based on matching up the width of the preview and the fixed aspect ratio. As the preview window should only cover the portion of content displayed in the first display area, the width of the preview window is fixed to the width of the preview itself. In order to only cover the portion of content displayed in the display area, the length (i.e., height) of the preview window must be set to maintain the aspect ratio.

FIGS. 6 and 7 illustrate two preview windows having the same aspect ratio but different sizes. Both FIGS. 6 and 7 illustrate the first display area 505 displaying portion 510 of content. However, the entirety of the visual content to which portion 510 belongs is greater in FIG. 7 than FIG. 6. As such, the preview window 625 is larger than the preview window 725. On the other hand, while the entirety of the visual content previewed in 520 is significantly less than the entirety of the visual content previewed in 620, preview windows 525 and 625 are the same size because previews 520 and 620 are the same width. Once the size of the preview window is determined, the process 300 determines (at 320) the portion of content that is displayed in the first display area. Initially, the portion of content displayed in the first display area might be the topmost content for vertically aligned content (or, for horizontally aligned content, the leftmost content). In some embodiments, the initially displayed portion of content might be a portion that a user was viewing at a previous instance.

The process 300 next displays (at 325) the preview window over the portion of the preview corresponding to the portion of content displayed in the first display area. In all of FIGS. 5-7, because the portion 505 of content is the same, the preview windows 525, 625, and 725 are all displayed over the same portion of the preview.

Next, at 330, the process 300 determines whether to scroll through the content. In some embodiments, a user can scroll through the visual content by either selecting one of the scroll arrows 530 (e.g., by using a cursor controller to place a cursor over the up or down arrow, and using a selection button to select the arrow). In some embodiments, selecting the down arrow causes content arranged below the previously displayed content to be displayed (i.e., the content appears to move upwards). Similarly, selecting the up arrow in such embodiments causes the content to appear to move downwards.

When the process determines to scroll through the content, the process returns to 320 to determine the portion of content displayed in the first display area. For example, as the content scrolls upwards, the next portion displayed will be missing content from the top of the previous portion and will have new content displayed at the bottom of the display area. The process also displays (at 325) the window over the corresponding portion of the preview. If the user is holding down one of the scroll arrows, the process 300 runs through steps 320-330 continuously until the user releases the scroll arrow.

Some embodiments also use the preview window itself as a navigation tool. A user in some embodiments can select the preview window and move the window along the preview to select a new portion of content to display in the first display area. Although initially the preview may appear to just look like a waveform, in some embodiments a user who has worked with the content a number of times prior may readily be able to differentiate between different portions and can easily move the preview window to the desired area. 320-330 are performed implicitly by the process when a user moves the preview window directly.

In some embodiments, a user can also directly select a portion of the content to display in the first display area by moving a cursor to the corresponding portion of the preview with a cursor controller and then pressing a selection button on the cursor controller. The process then displays the selected portion in the first display area, and moves the preview window to the selected portion of the preview. In some embodiments, the selected point (i.e., the cursor location when the user pressed a selection button) is displayed at the top of the display area, whereas in other embodiments the selected point is displayed at the center or bottom of the display area.

If the process determines (at 330) not to scroll through the content (i.e., no input is received), the process then determines (at 335) whether the content is being edited. For instance, a user might want to edit a certain portion of the content, so the user would first move the preview window to the portion of the preview corresponding to the desired portion as the process cycled through 320 to 330. In some embodiments, the user can then edit the content directly in the first display area. For example, the user can add, delete, or amend text in some embodiments.

When the content is edited, the process 300 returns to 310 to generate a new preview of the content, determine the size of the window for the new preview, etc. Some embodiments dynamically re-generate the preview as content is edited. For instance, as a user types new text into the first display area, some embodiments dynamically generate a new preview with each keystroke.

As an example, a user might start with the content as shown in FIG. 6. The user could then use the scroll arrows 530, select the preview window 625, or directly select a point in preview 620 to move a different portion of the content into the first display area. The user could then add content such that the preview (and, correspondingly, the preview window) would shrink. The user could then move the original portion of content into the first display area, resulting in the display areas illustrated in FIG. 7.

Some embodiments also treat a change in viewing position of the content in the first display area in the same way as if the content is edited. For example, in some embodiments, the content is viewed from a camera object in a media-editing application. Such camera objects are described further below. If the camera object zooms out from the content, then the content as seen in the first display area will shrink (and more of the content will be viewable in the first display area). Because the second display area maintains a constant width as the camera zooms out, the horizontal and vertical scales used to generate the preview must change in some embodiments so that the preview can fit entirely within the second display area. Accordingly, the preview must be re-generated as the camera object zooms out. One of ordinary skill will recognize that if the camera object zooms in on the content, or adjusts the viewing position in any other way (e.g., moving left or right), the preview will need to be re-generated.

Figure 10:
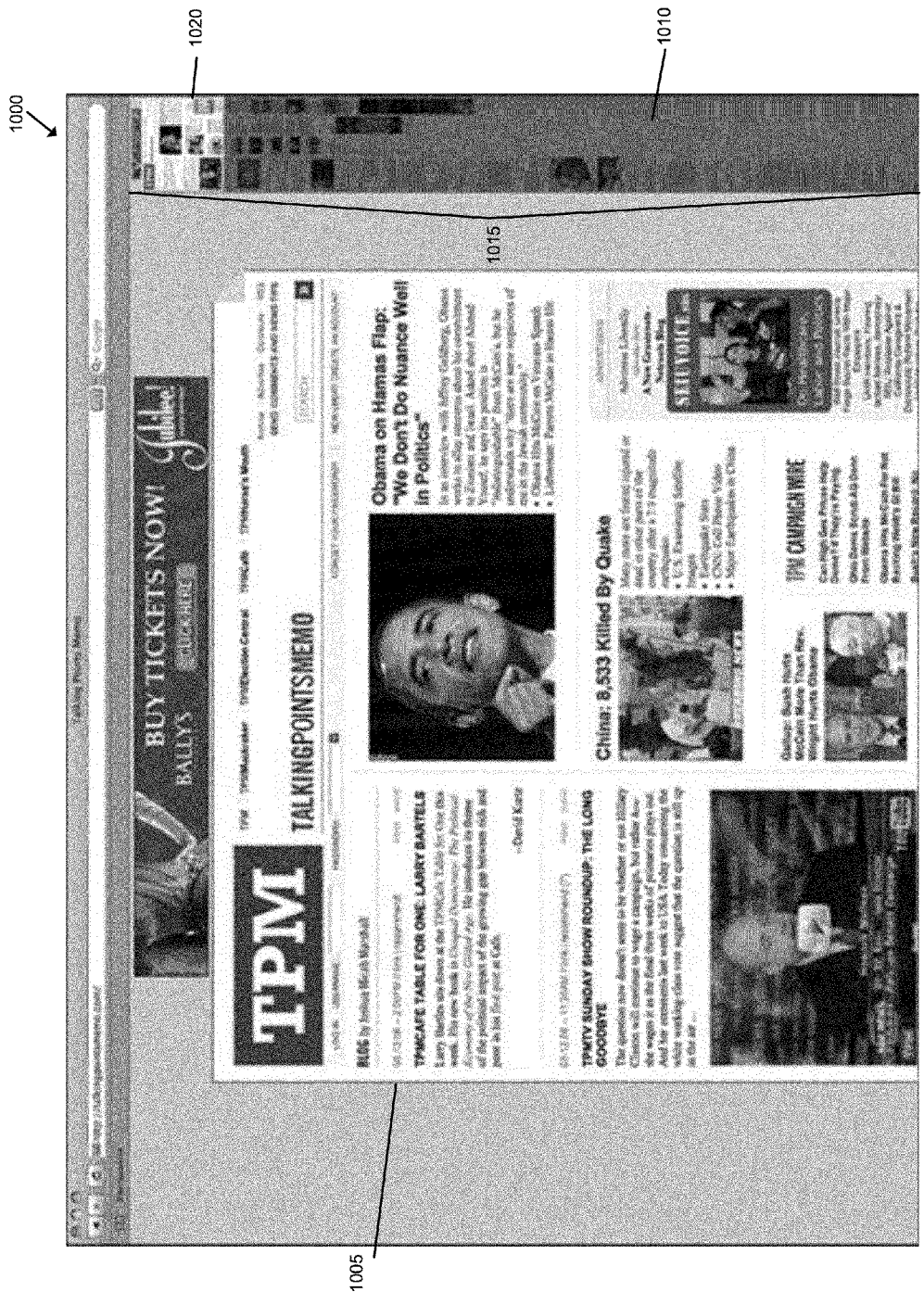
FIG. 10 illustrates a web browser of some embodiments that incorporates a scrollable preview of a web page.

Although the scrollable preview is illustrated above with the visual content as primarily text, the scrollable preview can also incorporate images as well in some embodiments. Furthermore, while the scrollable preview is shown below in the context of a media-editing application, process 300 can be performed for visual content in other contexts as well. For example, FIG. 10 illustrates a web browser of some embodiments that incorporates a scrollable preview of a web page. FIG. 10 illustrates a web browser 1000 displaying web page

1005. The web page 1005 extends below the bottom of the display area of the browser. Instead of the standard scrollbar from a typical browser, the web browser 1000 has a display area 1010 with preview 1015 and preview window 1020 highlighting the top of the preview. In some embodiments, a user can select a portion of the preview 1015 in order to cause the corresponding portion of the web page 1005 to be displayed in the browser 1000.

III. Scrollable Preview in Media-Editing Application

Figure 11:
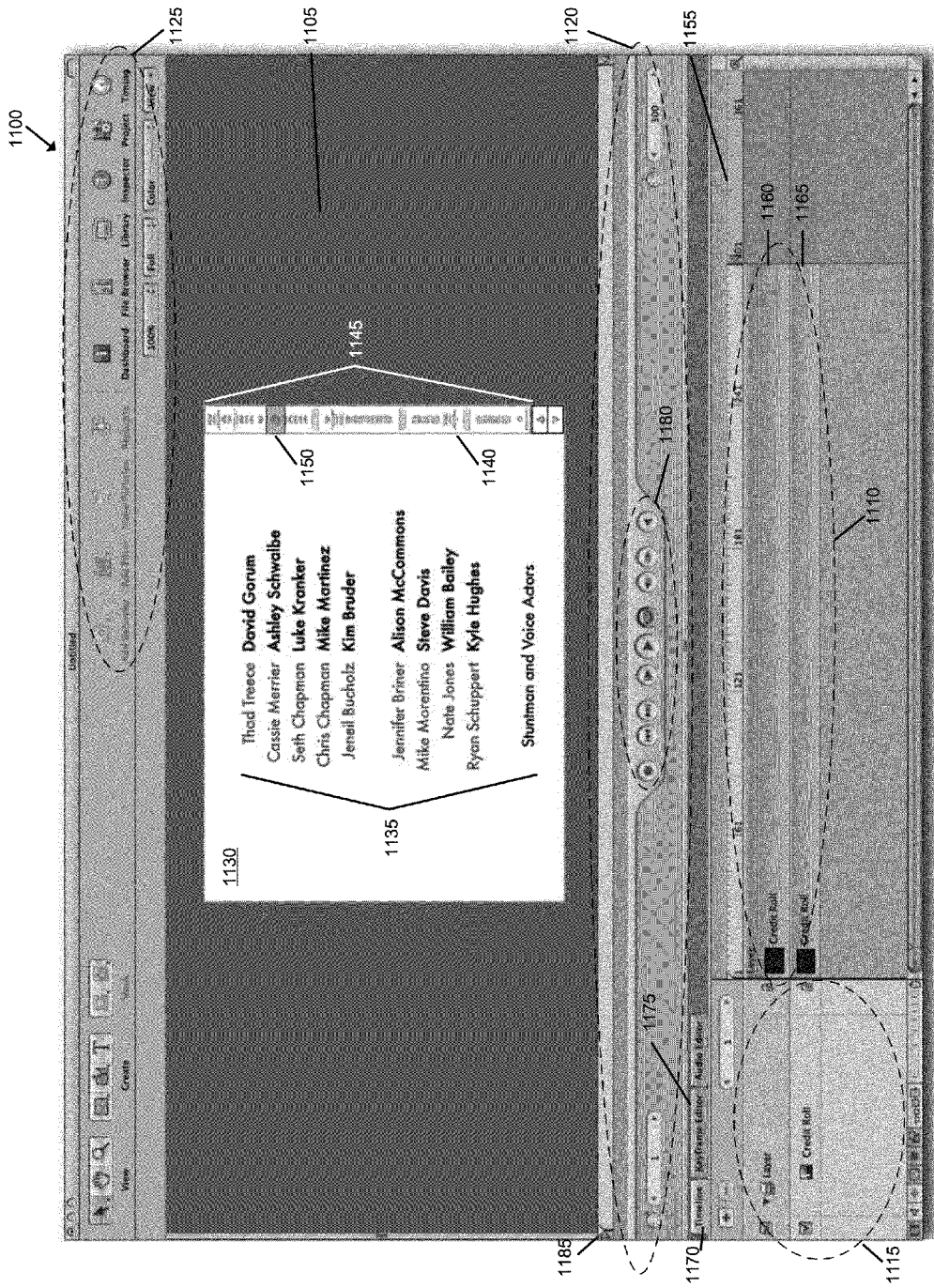
FIGS. 11 and 12 illustrate a media-editing application of some embodiments.

Some embodiments of the invention incorporate the scrollable preview into a media-editing application. FIG. 11 illustrates a media-editing application 1100 including a scrollable preview. Media-editing application 1100 includes a primary display area 1105, object timeline area 1110, object listing area 1115, global timeline area 1120, and icons 1125.

Figure 12:
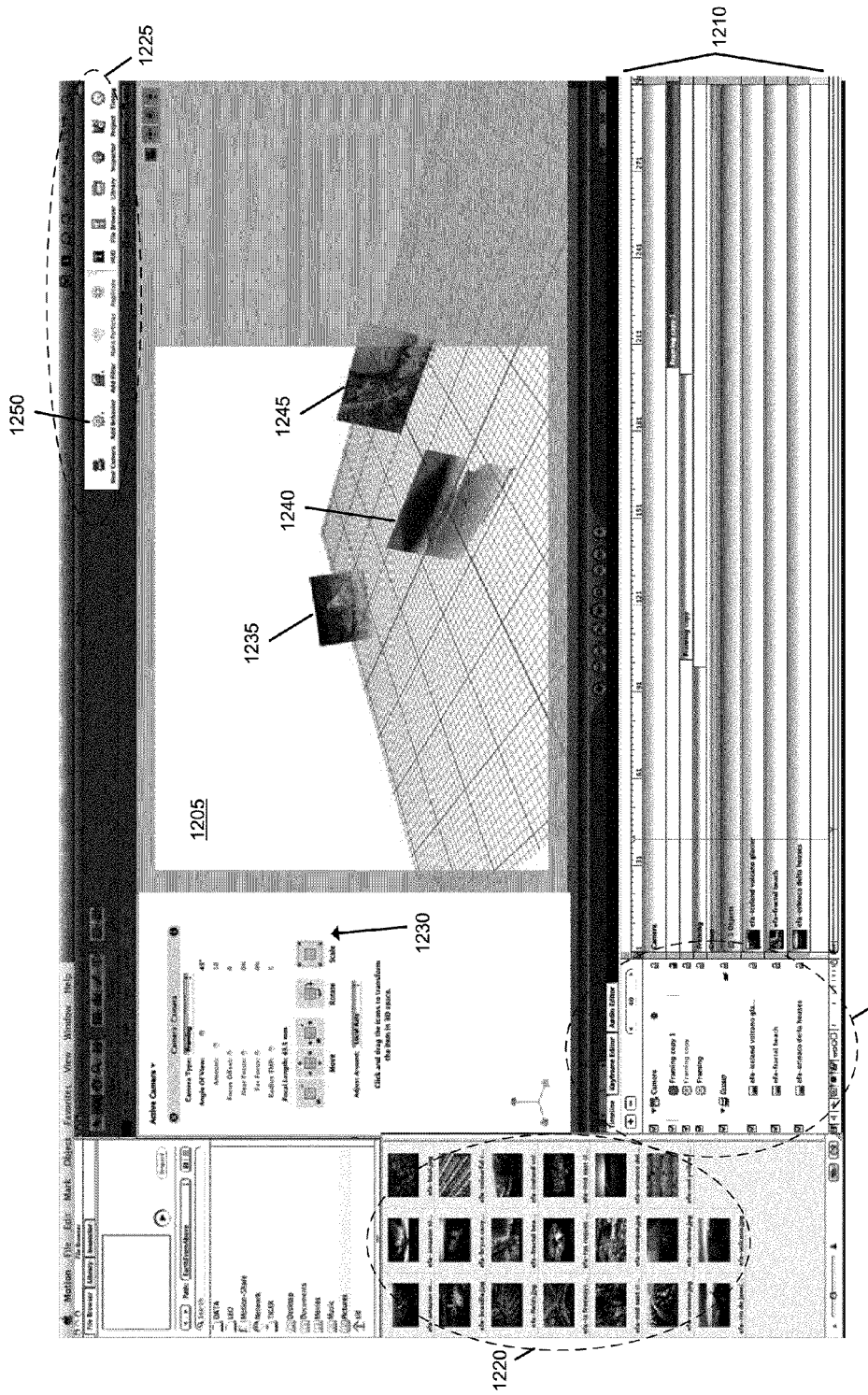

The primary display area 1105 of some embodiments enables a user to manipulate media objects to define video scenes. FIG. 12 illustrates the media-editing application of some embodiments in which a user has edited a video scene. FIG. 12 illustrates primary display area 1205, object timeline area 1210, object listing area 1215, object selection area 1220, icons 1225, and camera controls 1230 in addition to other features. In the primary display area are three media objects, 1235, 1240, and 1245 that a user can manipulate to define video scenes. In some embodiments, additional media objects can be added to a scene by dragging the objects from the object selection area 1220, which displays various objects for a user to select. In some embodiments, the scene is rendered by a camera object that captures the scene from a particular location, in a particular direction, within a particular field of view. Camera controls 1230 are used in some embodiments to modify the properties of the camera object.

In some embodiments, a user can manipulate scrollable visual content (e.g., text, images, etc.) in the primary display area. Some embodiments include, within the primary display area, a first display area that displays a portion of the scrollable content and a second display area that displays a preview of the content. FIG. 11 illustrates first display area 1130 displaying portion 1135 of content and second display area 1140 displaying preview 1145 and a preview window 1150 highlighting the portion of the preview corresponding to portion 1135. Some embodiments generate and display the preview and preview window as described above with respect to FIG. 3.

The timelines 1110 of some embodiments include timelines that indicate when within a video project different segments will be shown. In the depicted embodiment, time counter 1155 indicates time via a frame number (the objects shown run from frame zero to frame three hundred. some embodiments use other measurements (e.g., hour/minute/second) to indicate times. The object timeline area 1110 includes timelines for two objects: a timeline 1160 for a layer entitled "Credit Roll" and a timeline 1165 for a credit roll object also entitled "Credit Roll". The use of the scrollable preview in the context of credit rolls for a media-editing application is described in detail below. In some embodiments, a user can select and drag the edges of a timeline to modify the time (or frame) when the corresponding object begins or ends.

Object listing area 1115 includes indicators for objects corresponding to each of the timeliness. In some embodiments, the object listing area includes indicators for objects that do not have a corresponding timeline. The object listing area can also include indicators for other types of objects, such as a camera object, that do have corresponding timeliness Object listing area includes tabs 1170 and 1175. Tab 1170 is a timeline tab of some embodiments that enables a user to view and utilize the object timeliness. In some embodiments, selecting tab 1175 causes the object timelines to be replaced by a keyframe editor. The keyframe editor is described in further detail below.

FIG. 12 illustrates numerous timelines in the object timeline area 1210. For example, object timeline area 1210 includes timelines for the three media objects 1235, 1240, and 1245. The object timeline area 1210 also includes timelines for the camera object and three behaviors ("Framing", "Framing copy", and "Framing copy 2") for the camera object. In some embodiments, a user can set behaviors that direct a camera to move, rotate, or otherwise change in a particular manner over a specified duration of time. For example, in some embodiments, users can set behaviors of a camera in order to frame a particular object, follow the particular object as it moves, or change focal properties of the camera in order to focus on the particular object. A user can set the duration of such behaviors in some embodiments by modifying the length of the timeline associated with the particular behavior.

Global timeline area 1120 includes a global timeline for a video project. In the depicted embodiment, the global timeline is only 300 frames (the length of the credit roll). In some cases, the video project (and thus the global timeline) is longer than any of the individual object timeliness. The global timeline area 1120 also includes controls 1180, which can be used to playback a video project. For example, in some embodiments, hitting the play button will cause the video project to playback from the beginning. In some embodiments, a user can use the controls 1180 in conjunction with the object timelines to start playing back a video project from a time indicated by playhead 1185.

The media-editing application 1100 also includes icons 1125. Icons 1125 enable a user to perform various functions, such as controlling camera objects, adding filters, opening menus, etc. Similarly, FIG. 12 also illustrates icons 1225. In some embodiments, in order to define a new behavior for a camera object, a user would select the add behavior icon 1250 in order to bring up a drop-down menu of possible behaviors.

IV. Credit Rolls

As mentioned above, some embodiments specifically use the scrollable preview in a media-editing application for navigation of a credit roll. In some embodiments, a user will wish to add a credit roll that lists the actors, stuntmen, film crew, etc. for a video project to the end of that video project (or anywhere else in the video project such as at the beginning). In general, during playback, a credit roll will scroll from top to bottom. In some embodiments, the credit roll scrolls at a constant speed.

Figure 13:
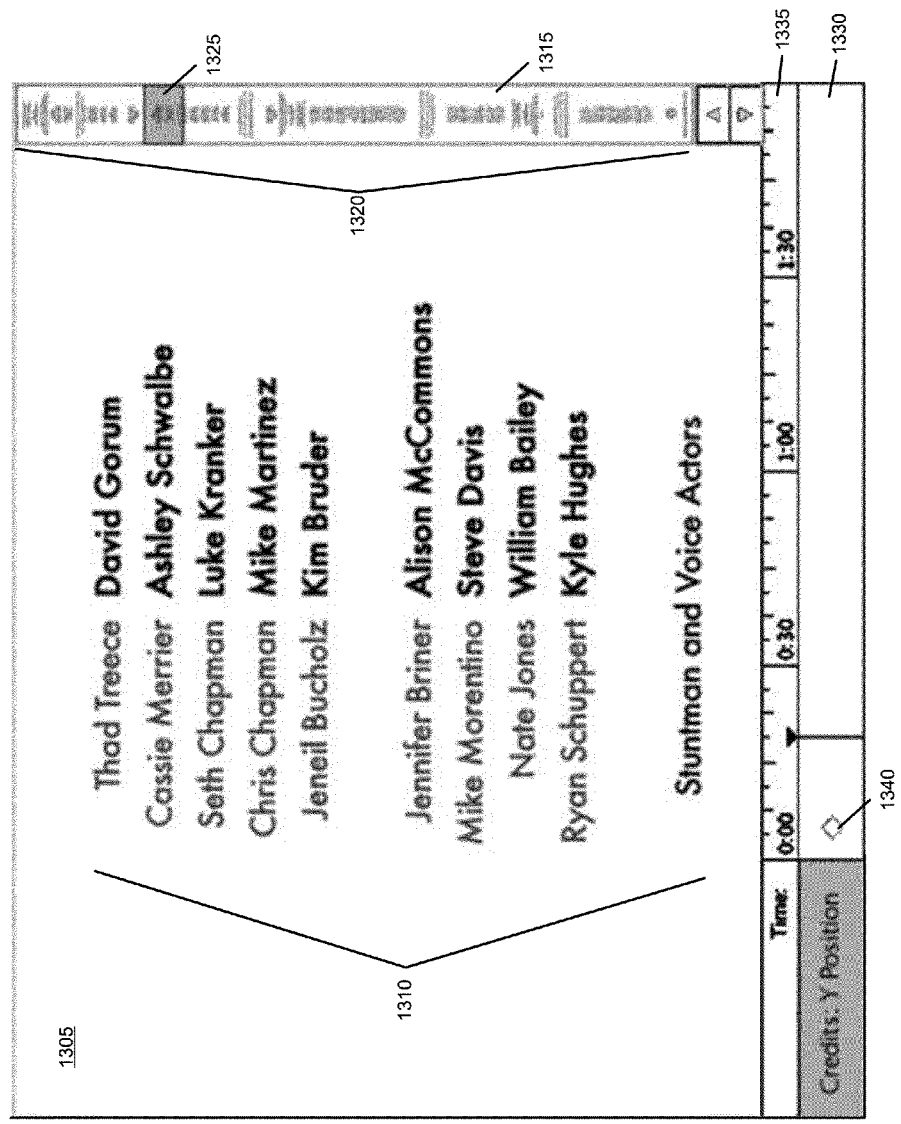
FIGS. 13 and 14 illustrate a credit roll and scrollable preview of the credit roll of some embodiments.

FIG. 13 illustrates a credit roll and scrollable preview from a media-editing application of some embodiments. In some embodiments, the credit roll and scrollable preview illustrated in FIG. 13 is displayed in the primary display area of a media-editing application such as 1100. The credit roll is displayed in first display area 1305, which displays a portion 1310 of the entire credits. Second display area 1315 displays a preview 1320, with a preview window 1325 indicating the portion 1310 of the credit roll displayed in the first display area 1305.

A credit roll, in some embodiments, is played over a particular duration of time. In some embodiments, this duration of time is represented by the object timeline for the credit roll. For example, FIG. 11 illustrates the credit roll timeline 1165. The credit roll timeline 1165 is set at a duration of 300 frames. In some embodiments, a user can modify the length of the timeline by dragging the ends of the timeline left (to shorten the duration) or right (to lengthen the duration).

In some embodiments, a user can control the duration of the credit roll by setting keyframes. Setting keyframes also allows a user to set a credit roll to play at variable speed in some embodiments. For example, a user might want a credit roll to play at one speed while displaying the actors and actresses of a video project and another speed while displaying the other people involved (e.g., production assistants, stuntmen, etc.).

As mentioned above, in some embodiments of the media-editing application, selecting keyframe editor tab 1175 causes the application to replace the object timelines with a keyframe editor. In some embodiments, the keyframe editor for a credit roll is instead displayed directly below the credit roll.

Figure 14:
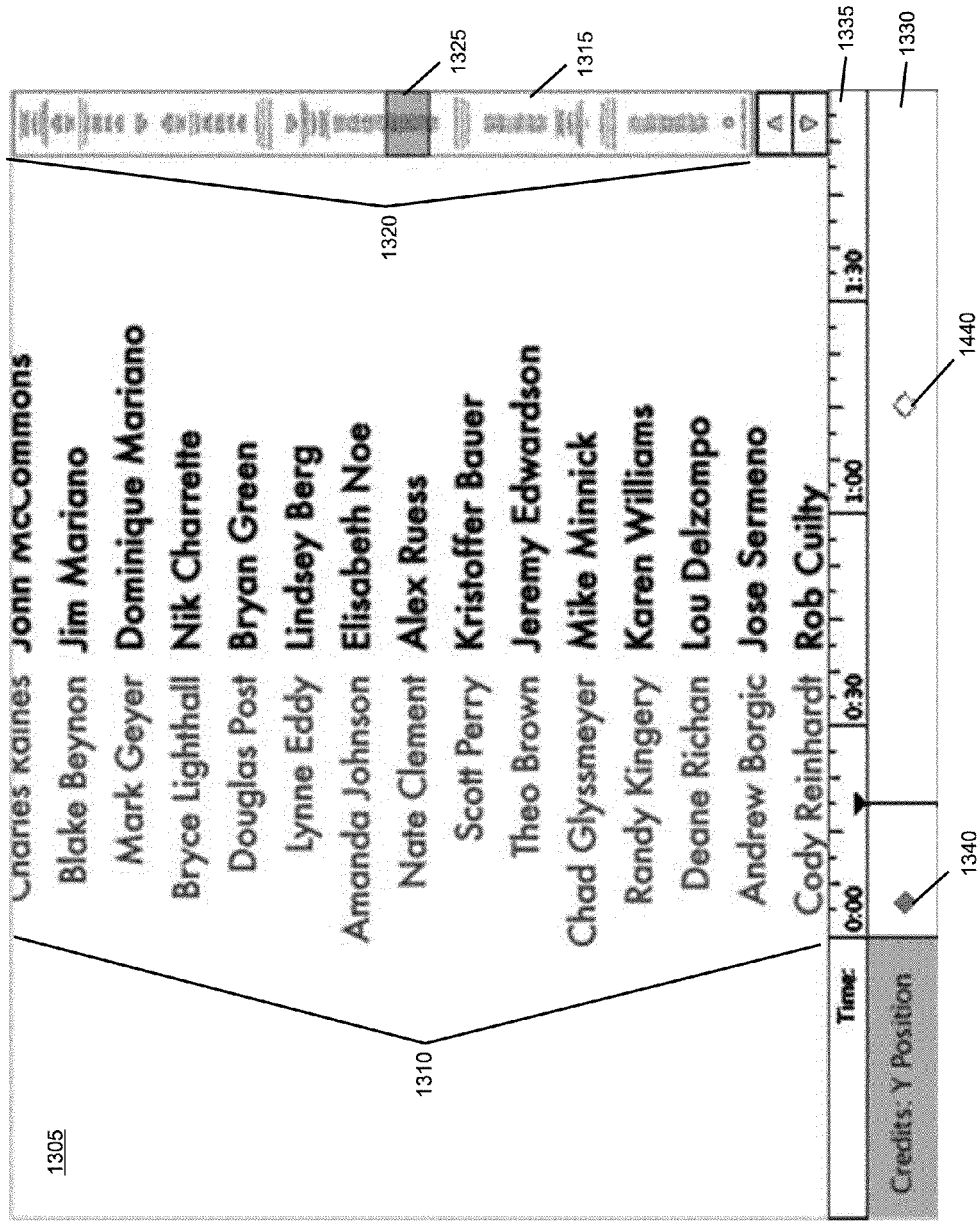

FIGS. 13 and 14 illustrate the use of a keyframe editor directly below the credit roll display areas. In FIG. 13, the user has (via the preview window 1325, the scroll arrows, or other methods) placed the portion 1310 of content into the first display area (and thus the preview window 1325 over the corresponding portion of the preview).

Directly below the first display area is a keyframe editor 1330 with a time indicator line 1335. In some embodiments, the user can select the particular portion of the credit roll displayed in the first display area to be a keyframe. In some embodiments, while the particular portion is displayed in the display area, the user selects a time to match up that portion of the credit roll with. For example, a user can input a time directly or double-click in the appropriate horizontal position in the keyframe editing window in some embodiments. One of ordinary skill in the art would recognize that various selection methods would be available in various embodiments.

FIG. 13 illustrates that a keyframe, represented by keyframe indicator 1340, has been added at approximately four seconds along the time indicator line 1335. This means that when the credit roll is played back, the portion 1310 will be displayed four seconds into the playback. FIG. 14 illustrates a second portion 1410 of the credit roll displayed in the first display area 1405. The preview window 1325 has moved with the content to the portion of the preview corresponding to portion 1410 of the credit roll. FIG. 14 also illustrates that a keyframe, represented by keyframe indicator 1440, has been added at approximately one minute and fifteen seconds along the time indicator line 1335. This means that when the credit roll is played back, the portion 1410 will be displayed one minute and fifteen seconds into the playback.

The keyframe indicator 1340 that indicates the keyframe for portion 1310 has turned gray in FIG. 14. In some embodiments, a particular keyframe indicator is a different color when its corresponding frame is displayed in the first display area. Accordingly, keyframe indicator 1340 is the same color in FIG. 13 as the keyframe indicator 1440 in FIG. 14. Along the same lines, the keyframe indicator 1340 is a different color in FIGS. 13 and 14.

In some embodiments, although the preview window is not directly tied to the keyframes, it can be used to set the keyframes. A typical workflow for setting the keyframes indicated by indicators 1340 and 1440 would be for a user to first drag the preview window 1325 such that portion 1310 of the credits is in the first display area. Then the user can add a keyframe at the chosen time (in FIG. 13, the four second mark). Next, the user would drag the preview window 1325 to the next desired location on the preview 1320 such that portion 1410 of the credits is in the first display area. The user would then add a second keyframe at a new time (in FIG. 14, the one minute and fifteen second mark).

Figure 15:
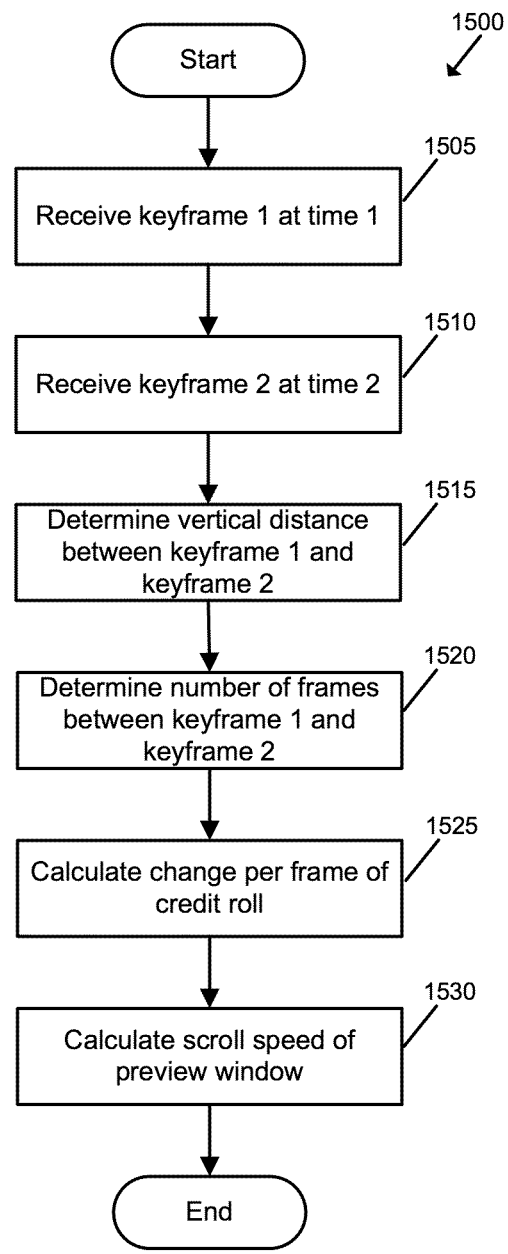
FIG. 15 illustrates a method of some embodiments for scrolling through visual content.

When the credit roll is played back, the media-editing application of some embodiments scrolls through the credits at a rate determined by the keyframes. In some embodiments, the preview window also scrolls down the preview as the credits scroll through the first display area. FIG. 15 illustrates a process 1500 of some embodiments for determining how to play a credit roll based on keyframes.

Process 1500 begins by receiving (at 1505) a first keyframe at a first time. For example, the first keyframe at the first time could be the frame with portion 1310 of the credit roll, at a time of four seconds. The process 1500 then receives (at 1510) a second keyframe at a second time. For example the second keyframe at the second time could be the frame with portion 1410 of the credit roll, at a time of one minute and fifteen seconds.

In some embodiments, where the user does not set keyframes but instead relies on the object timeline to indicate the duration of the credit roll, the first and second keyframes are the starting and ending frames of the credit roll. Accordingly, the first time for the first keyframe in such embodiments is the beginning time for the credit roll, and the second time for the second keyframe is the finishing time for the credit roll.

After receiving the first and second keyframes, the process 1500 determines (at 1515) the vertical distance between the first and second keyframes. For example, the process might determine this distance in pixels or other measurements of distance. This distance is, essentially, how far the credit roll has to scroll to get from the first keyframe to the second keyframe.

The process next determines (at 1520) the number of frames between the first and second keyframes (i.e., between the first time and the second time). In the example above, there is approximately one minute and eleven seconds between the two keyframes. In the situation where the keyframes are the beginning and end times of the credit roll, the time between keyframes is simply the duration of the credit roll. If the time is known in units such as minutes and seconds, then in some embodiments, the process converts this to a number of frames. Accordingly, if the time is one minute, then the process multiplies the sixty seconds in a minute by the number of frames per second (e.g., 24, 30, 60, etc.) in order to determine the number of frames between the keyframes.

Next, the process calculates (at 1525) the change per frame of credit roll. In some embodiments, the process 1525 divides the distance between the keyframes by the number of frames between the keyframes in order to calculate the change per frame of the credit roll. As an example, if the frames were 2880 pixels and sixty seconds apart, and the credit roll was played at 24 frames per second, then the credit roll would move at exactly two pixels per frame.

Finally, at 1530, the process calculates the scroll speed of the preview window. This calculation is performed similarly to the calculation at 1525, in that it is based on a distance that must be traversed over a specific duration at a constant rate.

The process 1500 determines how the credit roll is played between the first and second keyframes. If the second keyframe is not the end of the credit roll, and there is another keyframe, then for the segment of the credit roll between the second and third keyframes, process 1500 is performed with the second keyframe now as the first keyframe and the third keyframe as the second keyframe, in order to determine the speed of the credit roll between these two keyframes.

V. Software Architecture

Figure 16:
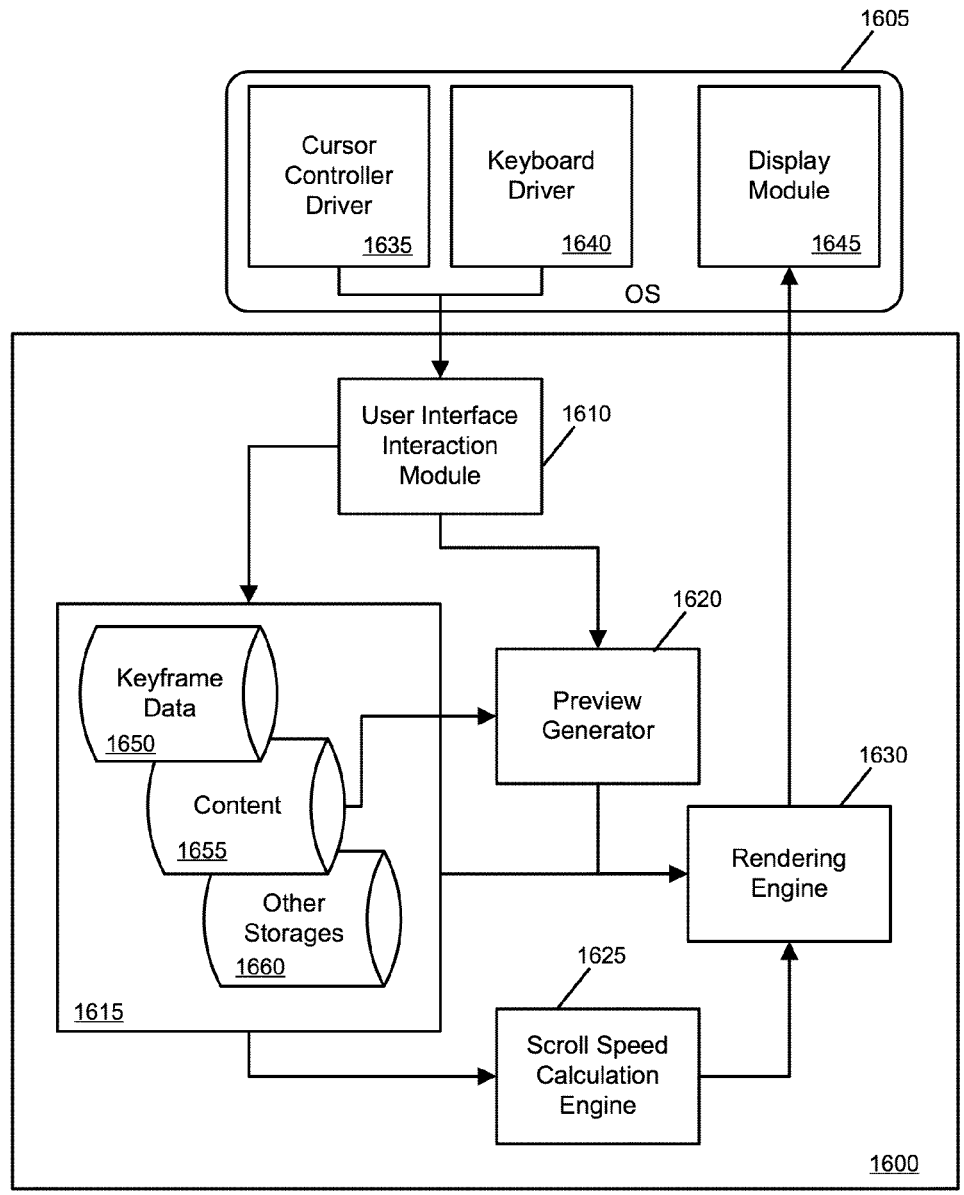
FIG. 16 illustrates the software architecture of some embodiments of the media-editing application.

As discussed above, some embodiments of the invention are incorporated into a media-editing application. FIG. 16 conceptually illustrates the software architecture of a media-editing application 1600 of some embodiments. In some embodiments, the media-editing application 1600 is a stand-alone application or is integrated into another application, while in other embodiments the application might be implemented within an operating system. FIG. 16 illustrates the case where the media-editing application is not incorporated into the operating system, and also illustrates operating system 1605.

Media-editing application 1600 includes a user interface interaction module 1610, a set of storages 1615, a preview generator 1620, a scroll speed calculation engine 1625, and a rendering engine 1630. The set of storages 1615 includes storages for keyframe data 1650, content data 1655, as well as other data 1660 (e.g., data about media objects in a video scene). The operating system 1605 includes a cursor controller driver 1635, a keyboard driver 1640, and a display module 1645.

A user interacts with items in the user interface of the media-editing application via input devices (not shown) such as a cursor controller (e.g., a mouse, touchpad, etc.) and keyboard. The input from these devices is processed by the cursor controller driver 1635 and the keyboard driver 1640, and passed to the user interface interaction module 1610.

The user interface interaction module 1610 translates the data from the drivers 1635 and 1640 into the user's desired effect on the media-editing application. For example, when the user edits content in a display area of the media-editing application, the user interface interaction module 1610 modifies the content stored in storage 1655. An example of the user editing content is if the user adds more names to a credit roll in a display area of the media-editing application. The user interface interaction module 1610 also receives input data that is translated as instructions to scroll through visual content in the first display area (for example, if a user clicks on and drags a preview window over a preview. This information is passed to preview generator 1620 in some embodiments.

Preview generator 1620 of some embodiments generates a preview based on content stored in storage 1655. In some embodiments, preview generator 1620 also generates a preview window after generating the preview, and manages the movement of the preview window. If content is edited, that content is passed to the preview generator 1620 so that a new preview can be generated. Preview generator 1620 performs some or all of the processes 300 and 900 in some embodiments.

The scroll speed calculation engine 1625 of some embodiments determines how fast content (e.g., a credit roll) should scroll when played back by a user. In some embodiments, scroll speed calculation engine also determines how fast the preview window should scroll as well. The calculation engine 1625 uses keyframe data 1650 and content data 1655 in order to perform these calculations. In some embodiments, scroll speed calculation engine 1625 performs some or all of process 1500.

Rendering engine 1630 enables the output of audio and video from the media-editing application. For example, rendering engine 1630 uses data about media objects in a video scene to render the video scene from the particular location, direction, etc. defined by a camera object. As such, the rendering engine receives, in some embodiments, preview data from the preview generator so that the preview can be displayed. The rendering engine 1630 also manages, in some embodiments, the output of the playback of a credit roll. Accordingly, the rendering engine 1630 receives scroll speed data from the scroll speed calculation engine 1625.

Data from the rendering engine 1630 (e.g., audio and video data of a video scene, credit roll and preview data, etc.) are passed to the display module 1645. Display module 1645 enables the display of the media-editing application (and other applications) on a display device (e.g., a CRT monitor, LCD screen, etc.).

While many of the features have been described as being performed by one module (e.g., the UI interaction module 1610 or preview generator 1620), one of ordinary skill would recognize that a particular operation might be split up into multiple modules, and the performance of one feature might even require multiple modules in some embodiments.

VI. Computer System

Figure 17:
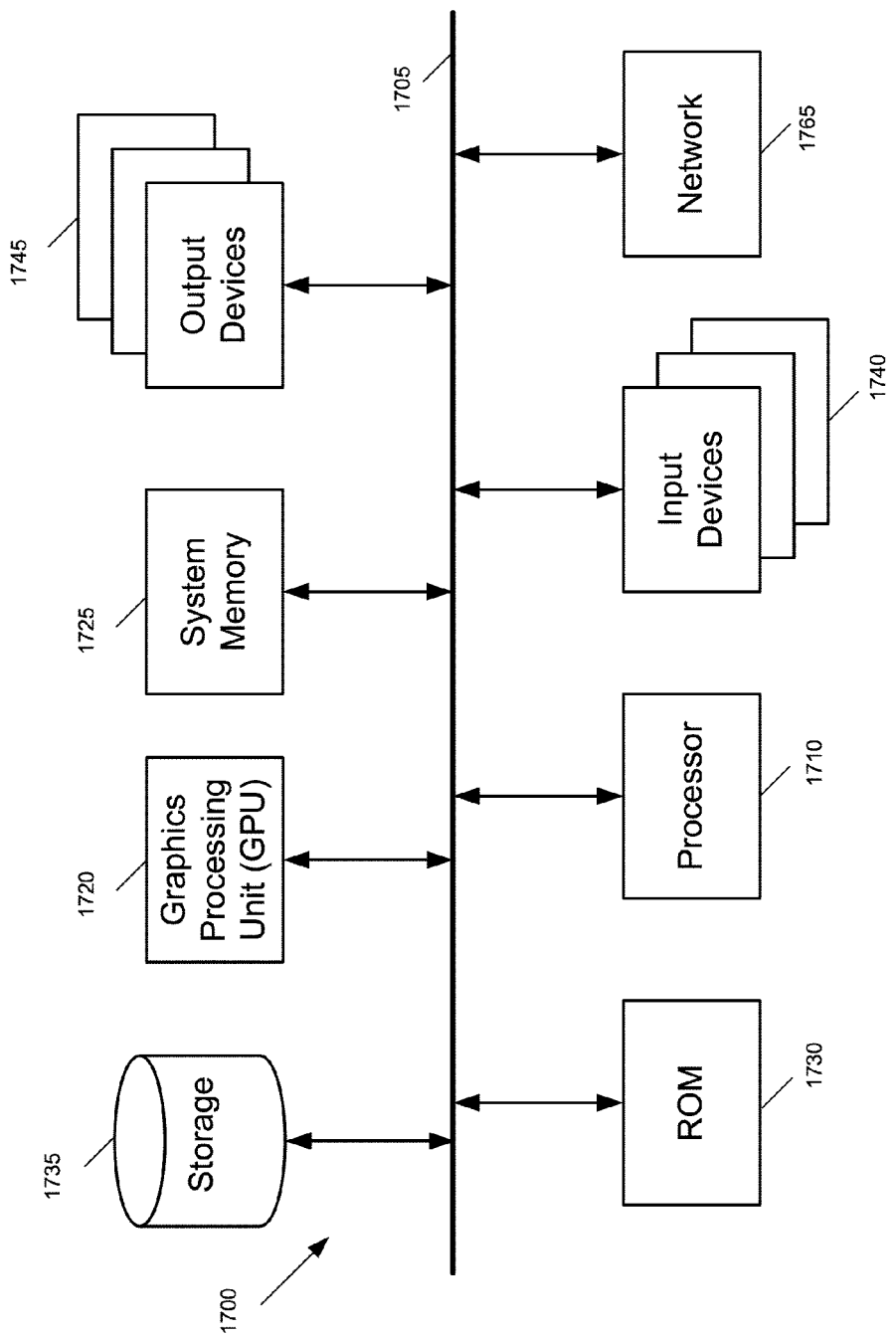
FIG. 17 conceptually illustrates a computer system with which some embodiments of the invention are implemented.

Computer programs for implementing some embodiments are executed on computer systems. FIG. 17 illustrates a computer system with which some embodiments of the invention are implemented. Such a computer system includes various types of computer readable media and interfaces for various other types of computer readable media. Computer system 1700 includes a bus 1705, a processor 1710, a graphics processing unit (GPU) 1720, a system memory 1725, a read-only memory 1730, a permanent storage device 1735, input devices 1740, and output devices 1745.

The bus 1705 collectively represents all system, peripheral, and chipset buses that communicatively connect the numerous internal devices of the computer system 1700. For instance, the bus 1705 communicatively connects the processor 1710 with the read-only memory 1730, the GPU 1720, the system memory 1725, and the permanent storage device 1735.

From these various memory units, the processor 1710 retrieves instructions to execute and data to process in order to execute the processes of the invention. Some instructions are passed to and executed by the GPU 1720. The GPU 1720 can offload various computations or complement the image processing provided by the processor 1710. In some embodiments, such functionality can be provided using CoreImage's kernel shading language.

The read-only-memory (ROM) 1730 stores static data and instructions that are needed by the processor 1710 and other modules of the computer system. The permanent storage device 1735, on the other hand, is a read-and-write memory device. This device is a non-volatile memory unit that stores instructions and data even when the computer system 1700 is off. Some embodiments of the invention use a mass-storage device (such as a magnetic or optical disk and its corresponding disk drive) as the permanent storage device 1735.

Other embodiments use a removable storage device (such as a floppy disk, flash drive, or ZIP® disk, and its corresponding disk drive) as the permanent storage device. Like the permanent storage device 1735, the system memory 1725 is a read-and-write memory device. However, unlike storage device 1735, the system memory is a volatile read-and-write memory, such a random access memory. The system memory stores some of the instructions and data that the processor needs at runtime. In some embodiments, the invention's processes are stored in the system memory 1725, the permanent storage device 1735, and/or the read-only memory 1730.

The bus 1705 also connects to the input and output devices 1740 and 1745. The input devices enable the user to communicate information and select commands to the computer system. The input devices 1740 include alphanumeric keyboards and pointing devices (also called "cursor control devices"). The output devices 1745 display images generated by the computer system. For instance, these devices display a GUI. The output devices include printers and display devices, such as cathode ray tubes (CRT) or liquid crystal displays (LCD).

Finally, as shown in FIG. 17, bus 1705 also couples computer 1700 to a network 1765 through a network adapter (not shown). In this manner, the computer can be a part of a network of computers (such as a local area network ("LAN"), a wide area network ("WAN"), or an Intranet, or a network of networks, such as the internet. For example, the computer 1700 may be coupled to a web server (network 1765) so that a web browser executing on the computer 1700 can interact with the web server as a user interacts with a GUI that operates in the web browser.

Any or all components of computer system 1700 may be used in conjunction with the invention. For instance, in some embodiments the execution of the frames of the rendering is performed by the GPU 1720 instead of the CPU 1710. Similarly, other image editing functions can be offloaded to the GPU 1720 where they are executed before the results are passed back into memory or the processor 1710. However, a common limitation of the GPU 1720 is the number of instructions that the GPU 1720 is able to store and process at any given time. Therefore, some embodiments adapt instructions for implementing processes so that these processes fit onto the instruction buffer of the GPU 1720 for execution locally on the GPU 1720. Additionally, some GPUs 1720 do not contain sufficient processing resources to execute the processes of some embodiments and therefore the CPU 1710 executes the instructions. One of ordinary skill in the art would appreciate that any other system configuration may also be used in conjunction with the present invention.

As mentioned above, the computer system 1700 may include any one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, and floppy disks.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A computer-implemented method for a video editing application, the method comprising:
    providing a first display area for displaying, on a display device, a credit roll that automatically scrolls through the first display area over a specified amount of time during playback of a media clip that includes the credit roll, such that at a particular time only a particular portion of the credit roll is displayed;
    providing a second display area for displaying, on the display device, a single continuous non-text image of the entire credit roll fitting entirely within the second display area as a visual approximation of the entire credit roll, wherein a modification of the credit roll in the first display area automatically modifies the corresponding visual approximation in the second display area; and
    providing a window within the second display area, the window for displaying over a portion of the visual approximation of the entire credit roll corresponding to the particular portion of the entire credit roll displayed in the first display area, wherein the location of the window in the second display area automatically changes during playback of the media clip in order for the window to maintain a location over the portion of the visual approximation that corresponds to the particular portion of the entire credit roll displayed in the first display area as the entire credit roll automatically scrolls through the first display area.

2. The method of claim 1, wherein the first display area has an aspect ratio, wherein the window maintains a same aspect ratio as the first display area.

3. A non-transitory machine readable medium storing a program executable by at least one processing unit, the program comprising sets of instructions for:
    displaying, in a first display area, a credit roll that automatically scrolls through the first display area over a specified amount of time during playback of a media clip that includes the credit roll, such that at a particular time only a particular portion of the credit roll is displayed;
    displaying, in a second display area, a preview of the entire credit roll as a single continuous image that fits entirely within the second display area as a visual approximation of the entire credit roll, wherein a modification of the credit roll in the first display area automatically modifies the corresponding visual approximation in the second display area; and
    providing a window within the second display area, the window for indicating, in the preview, a portion of the credit roll that is concurrently displayed in the first display area, wherein the location of the window in the second display area automatically changes during playback of the media clip in order for the window to maintain a location over the portion of the visual approximation that corresponds to the particular portion of the entire credit roll displayed in the first display area as the entire credit roll automatically scrolls through the first display area.

4. The non-transitory machine readable medium of claim 3, wherein the credit roll has a continuous flow with no pre-specified page formatting.

5. The non-transitory machine readable medium of claim 3, wherein the credit roll is not confined to any particular length.

6. The non-transitory machine readable medium of claim 3, wherein the credit roll is text based content comprising a plurality of text characters, wherein the set of instructions for displaying the preview comprises a set of instructions for scaling each text character individually in the preview.

7. The non-transitory machine readable medium of claim 6, wherein the set of instructions for scaling each text character comprises a set of instructions for scaling the text character to a rectangle in the preview.

8. The non-transitory machine readable medium of claim 6, wherein the set of instructions for scaling each text character comprises a set of instructions for scaling the text character to a character that approximates the text character.

9. The non-transitory machine readable medium of claim 3, wherein the credit roll is text-based content comprising a plurality of lines of text, wherein the set of instructions for displaying the preview comprises a set of instructions for scaling each line of text individually in the preview.

10. The non-transitory machine readable medium of claim 9, wherein the set of instructions for scaling each line of text comprises a set of instructions for scaling each line to a rectangle.

11. The non-transitory machine readable medium of claim 3, wherein a width of the window is less than a width of the second display area.

12. The non-transitory machine readable medium of claim 11, wherein the window comprises a set of columns that fill the remainder of the width of the second display area.

13. The method of claim 1 further comprising receiving additions of new content to the credit roll, wherein the visual approximation of the credit roll in the second display area changes in size as the additions of new content are received.

14. The method of claim 13, wherein the visual approximation of the credit roll in the second display area grows in size in a first direction up to a particular threshold with the addition of new content.

15. The method of claim 14, wherein the visual approximation of the credit roll in the second display area shrinks in size in a second direction with the addition of new content after the visual approximation has reached the particular threshold in the first direction.

16. The method of claim 14, wherein the particular threshold is a size of the second display area in the first direction.

17. The method of claim 1, wherein the credit roll does not fit entirely in the first display area such that the first display area only displays a portion of the credit roll.

18. The method of claim 1, wherein the credit roll has a continuous flow with no pre-specified page formatting.

19. The method of claim 1, wherein the credit roll is not confined to any particular length.

20. An apparatus comprising:
a set of processing units for executing sets of instructions;
a machine-readable medium storing a video editing application executable by at least one of the processing units, the video editing application comprising sets of instructions for:
displaying, in a first display area, a credit roll that automatically scrolls through the first display area over a specified amount of time during playback of a media clip that includes the credit roll, such that at a particular time only a particular portion of the credit roll is displayed;
displaying, in a second display area, a preview of the entire credit roll as a single continuous image that fits entirely within the second display area as a visual approximation of the entire credit roll, wherein a modification of the credit roll in the first display area automatically modifies the corresponding visual approximation in the second display area; and
providing a window within the second display area, the window for indicating, in the preview, a portion of the credit roll that is concurrently displayed in the first display area, wherein the location of the window in the second display area automatically changes during playback of the media clip in order for the window to maintain a location over the portion of the visual approximation that corresponds to the particular portion of the entire credit roll displayed in the first display area as the entire credit roll automatically scrolls through the first display area.

21. The apparatus of claim 20, wherein the credit roll has a continuous flow with no pre-specified page formatting.

22. The apparatus of claim 20, wherein the credit roll is not confined to any particular length.

23. The apparatus of claim 20, wherein the credit roll is text based content comprising a plurality of text characters, wherein the set of instructions for displaying the preview comprises a set of instructions for scaling each text character individually in the preview.

24. The apparatus of claim 23, wherein the set of instructions for scaling each text character comprises a set of instructions for scaling the text character to a rectangle in the preview.

25. The apparatus of claim 23, wherein the set of instructions for scaling each text character comprises a set of instructions for scaling the text character to a character that approximates the text character.

26. The apparatus of claim 20, wherein the credit roll is text-based content comprising a plurality of lines of text, wherein the set of instructions for displaying the preview comprises a set of instructions for scaling each line of text individually in the preview.

27. The apparatus of claim 26, wherein the set of instructions for scaling each line of text comprises a set of instructions for scaling each line to a rectangle.

28. The apparatus of claim 20, wherein a width of the window is less than a width of the second display area.

29. The apparatus of claim 28, wherein the window comprises a set of columns that fill the remainder of the width of the second display area.

\* \* \* \* \*